Feb. 12, 1957     P. FAHLENBERG     2,780,971
AUTOMATIC SETTING DEVICE FOR PHOTOGRAPHIC CAMERAS
Filed June 26, 1952     2 Sheets—Sheet 1

INVENTOR
Paul Fahlenberg,
by John B. Grady
ATTORNEY

Feb. 12, 1957 P. FAHLENBERG 2,780,971
AUTOMATIC SETTING DEVICE FOR PHOTOGRAPHIC CAMERAS
Filed June 26, 1952 2 Sheets-Sheet 2
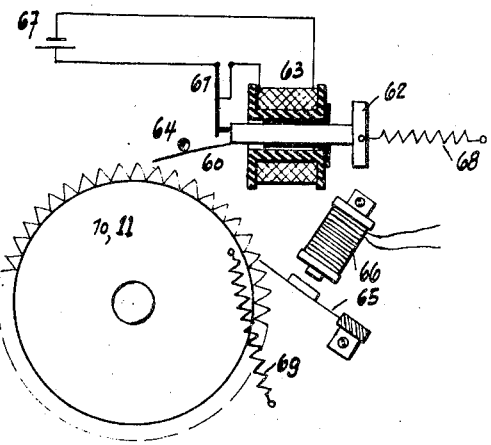
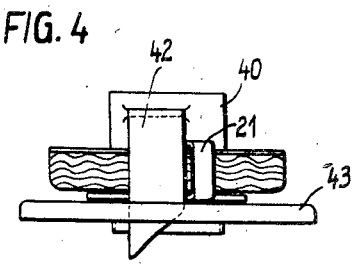
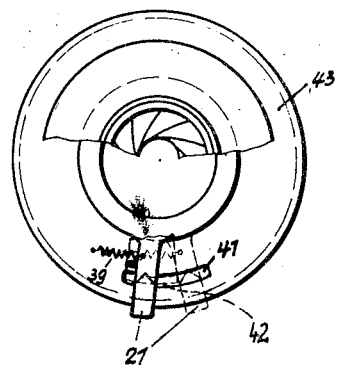
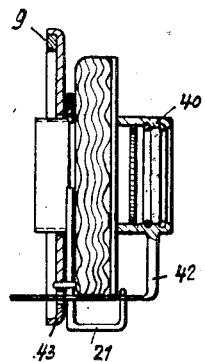
INVENTOR
PAUL FAHLENBERG, 2,780,971
Patented Feb. 12, 1957

2,780,971
AUTOMATIC SETTING DEVICE FOR PHOTOGRAPHIC CAMERAS

Paul Fahlenberg, Munich, Germany, assignor to Hans Deckel, Munchen-Solln, and Friedrich W. Deckel, Post Tutsing, Germany Application June 26, 1952, Serial No. 295,737

11 Claims. (Cl. 95—10)

This invention relates broadly to photography and more particularly to automatic regulating systems for the exposure constants of photographic cameras.

The object of the invention is to provide a wide range automatic regulation system for controlling the exposure constants of photographic cameras according to stop conditions, shutter speed, filter values, emulsion, illumination and other factors.

Heretofore in the art there have been various proposals for the automatic setting of the exposure constants or factors in a photographic camera, but in the main these attempts consider too many possibilities, the economical technical realization of which is as a rule impracticable. For this reason the present invention has been restricted to the normally-used range of exposure constants, although a more far-reaching solution is merely a question of expenditure. The range of automatic regulation practically corresponds with the less-sensitive range of commercially-available exposure meters.

The accompanying drawings illustrate diagrammatically examples of realization of the object of the invention.

Fig. 3 shows the use of driving pawls as control members; and

Figs. 4, 5 and 6 show the coupling of the device with a color-filter.

Figure 1:
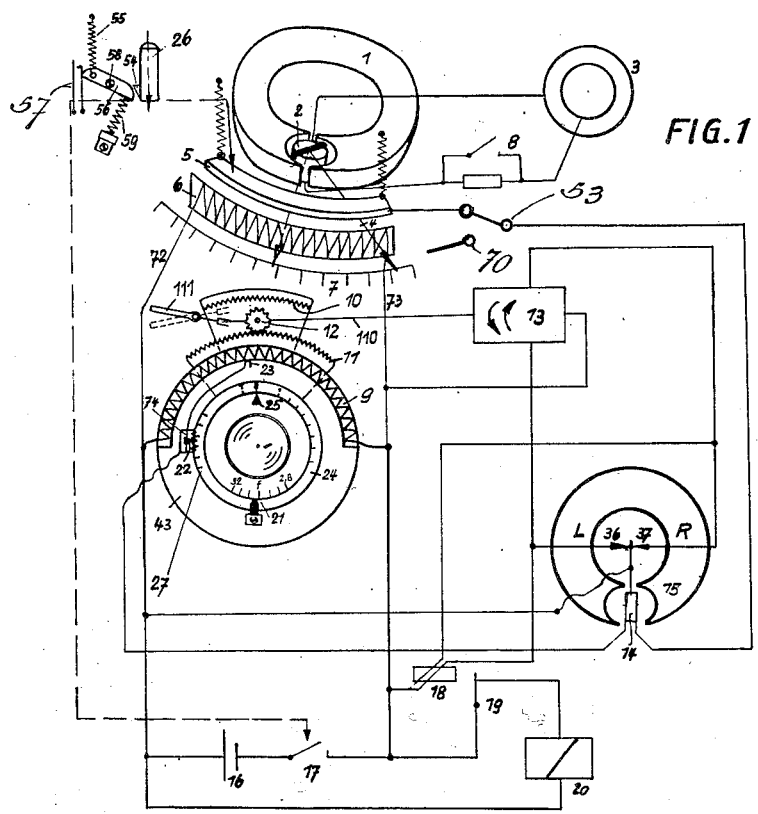
Fig. 1 shows the setting of the exposure constants by means of a resistance bridge.

Fig. 1 shows a standard exposure meter for the higher-sensitivity measuring range, said meter comprising a magnet 1, a moving coil 2, a photo-electric cell 3, a pointer 4, a scale 7, and a switch 8. The scale 7 has additionally under the track of the pointer a resistance strip 6, and above the pointer a pressure segment 5 connected with the camera release button 26. This ensures that the measuring system is free from all additioned masses.

A between-lens shutter of conventional design is provided concentrically to its optical axis with a resistance segment 9 on a carrier ring 43 which is connected with the stop pointer 21 and is rotatable about its axis. This carrier ring is further provided with a toothed segment 10. The time setting ring 24 carries the usual scale divisions the values of which are read off by a fixed pointer 25. A further element 74 with a pointer 22 is rotatably fitted on the shutter axis and carries a collector 23 sliding over the segment 9. The element 74 meshes in the time-setting ring 24. The position of this meshing point enables the sensitivity of the emulsion to be preset on a scale 27, attached to the time-setting ring 24.

The time-setting ring 24 also carries a toothed segment 11 actually of the same radius as the toothed segment 10 but shown as of smaller radius for the sake of clarity. A spur gear 12 is provided to engage at will with either the segment 10 or the segment 11. This spur gear is driven by an element 13 through flexible shaft 110 capable of being run in either direction. Lever 111 is provided for moving flexible shaft 110 upward or downward so that spur gear 12 may be made to mesh either with the segment 10 or segment 11. Segments 10 and 11 are located on opposite sides of the spur gear 12 and are selectively engaged thereby under control of lever 111. Mechanisms similar to said lever 111 and the arrangement thereof are conventional as shown for example in United States Patents 1,538,949 and 1,538,950 of 1924 to Osborne I. Price. This element 13 can be actuated by a spring-operated gear system which is wound up simultaneously with the film feed, or by a small electric motor controlled by a moving-coil relay for right-hand or left-hand drive, or stopping. The moving-coil relay itself consists of a magnet 15, a coil 14 with pointer, and contacts 36 and 37. The coil 14 connects to pointer 22 at one end and through switch 53 to pressure segment 5 at the other end. Switch 53 is movable from the full line position shown to the open contact 70. Connection is established from pressure segment 5 to resistance strip 6 from which the electrical circuit is completed to the bridge circuit and completed from the tap provided through pointer 22 with resistance 9 of the bridge circuit. Obviously, it is alternatively possible to use a suitable fixed or a rotary-core magnet system. To complete the arrangement a single cell battery 16, a switch 17, a locking relay 18, and a tripping magnet 20 are provided.

Figure 2:
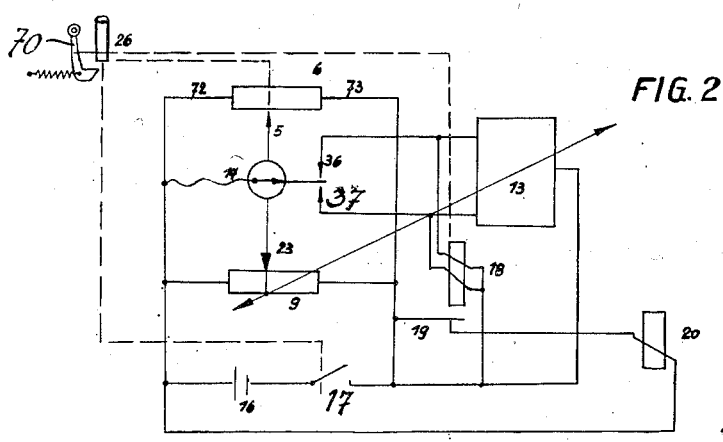
Fig. 2 is the electric circuit diagram of the arrangement of Fig. 1.

The manner of action is as follows:

Firstly, either the diaphragm or the exposure time is set manually according to the wishes of the photographer: for this purpose the spur gear 12 must be brought into the position of engagement with either the diaphragm setting or the exposure time setting means. When the film is introduced into the camera, the pointer 22 is set on the mark of the timing ring 24 corresponding to the selected emulsion sensitivity. By actinic effect, the pointer 4 of the exposure meter is set to say the line shown in Fig. 1. Pressure on the release button 26, operating through the pressure segment 5, which constitutes a tap, causes a section of the resistance 6 to be tapped, according to the illuminating value. The pressure on the release button 26 further closes the switch 17, by which the battery 16 is connected to the bridge formed by itself and the resistances 6 and 9 inter-connected by leads 72 and 73. The electrical part of the arrangement is represented in Fig. 2 as a circuit diagram. The no-load, moving-coil relay will in general close either the contact 36, or the contact 37; by which means the driving element 13 is started in the direction necessary to bring into balance the bridge, and furthermore, the coil of the locking relay 18 is excited, which by opening the contact 19, interrupts the circuit of the delay-action release magnet 20, and thus prevents the release of the camera shutter. According to the element with which the spur gear 12 engages, either the time-setting ring with the slider 23, or the resistance segment 9, is engaged with the camera diaphragm setting ring. The compensating action is terminated when the bridge is in balance, the moving-coil relay is dead, and the contacts 36 and 37 are open. This stops the drive 13, the relay 18 is released, closes the contact 19, thus actuates the releasing magnet 20, and operates the shutter.

The winding of the mainspring of the drive 13 can be linked to the setting of the camera shutter or the film feed. A further embodiment is shown in Fig. 1. A projection 54 on the release button 26, when the release button is depressed, rotates a rocking lever 56 turning about a pivot 58, which is then moved by a spring 55 as far as a spring stop 59. The rocking lever deflects, and its nose engages with the projection 54 of the release button which it turns during return to the initial position, far enough to actuate a contact 57. This excites a magnet which sets the drive 13. In the resting position of the button 26, the lever 56 disengages from the projection 54, and the contact 57 reopens.

In a further variation of the control element the spur gear 12 is replaced by a driving pawl with a self-interrupting repeating contact which moves the setting elements stepwise in place of the drive 13. Fig. 3 shows the pawl system acting as a controlling member.

The approximately V-toothed wheels 10 or 11 are moved forward toothwise by the striker-pins 60, 62. When the battery 67 is connected, the magnetic winding 63 attracts the armature 62. The thrust spring 60, deflected by the pin 64, strikes the corresponding tooth, and turns the wheel further. At the same time, the contact 61 is opened, the magnetic winding 63 is deenergized, and the striker-pin is returned by the spring 68 to the starting position. This closes the contact 61, and the cycle is repeated. A pawl movement of this type can also essentially be repeated in mirror arrangement, to obtain right-hand and left-hand running. The arrangement can be simplified if, for instance, a spring 69 is provided to draw the gear wheels in one direction: in this case, a pawl 65 must be provided, to lock the arrangement in the preset position. This pawl can either be temporarily released by the contact 57, or temporarily opened mechanically by a pushrod from the rocking lever 56, Fig. 1. This arrangement enables only one pawl system to be used, and, in application to a single-lens reflex camera, at the same time, the setting the distance with the greatest stop value.

Allowance can be made for the use of a color filter; e. g., either by masking the photoelectric cell with a suitable filter, or, by means of a pin on the filter mounting, altering the angle between the resistance segment 9 and the stop indicator 21 (with setting element for the iris diaphragm); for which purpose, e. g. (Figs. 4, 5 and 6), the pin 42 on the color filter 40, engages directly in a slot 41 of the resistance segment on the carrier ring 43 (outside the shutter mounting) and depresses the stop indicator 21, which is connected with the iris diaphragm but fully rotatable with respect to the carrier ring and is held in the rest position by the spring 39 against the left-hand stop, at so many stop intervals further as would correspond to the diminished illumination. At the same time, by suitable design, the pin 42 can be made to serve as a stop for retaining the filter.

In all other photographing conditions, e. g. in flashlight photography or engineering photographs, which can not be dealt with by the help of a standard exposure meter, the camera can without difficulty be operated in the ordinary way and actuated by the shutter release button.

If exposure constants are set which can no longer be dealt with by the regulating element, the relay shown at 18 and 19 in Fig. 2 blocks the shutter release; in addition, the end position of the controlled element is indicated by optical or acoustic means.

The principle of the invention can also be correspondingly applied to focal-plane shutters. Furthermore, the shutter-release lock 18, 19, 20 can also be actuated partially by mechanical means, the release button 26 being locked by a pawl 70 on the relay 18 until the setting operation is completed (Fig. 2).

While the invention has been described in certain preferred embodiments, it is realized that modifications may be made and it is desired that it be understood that no limitations upon the invention are intended other than may be imposed by the scope of the appended claims.

What I claim as new and desire to secure by Letters Patent of the United States is as follows:

1. An automatic camera setting device, wherein either the setting of the stop or the setting of the speed is effected automatically in dependence upon all other factors governing exposure comprising in combination a camera shutter, shutter speed setting means and stop setting means on said shutter, a shutter release operator, an exposure meter, two resistances with sliding tap contacts, indicating pointers in operational relationship with said contacts, said sliding tap contacts being in operational relationship with said exposure meter and said camera shutter, respectively, said two resistances forming a bridge circuit, shutter speed and stop adjusting means electrically connected to the bridge circuit between said sliding tap contacts, said adjusting means being actuated by an unbalance of said bridge circuit and acting upon said setting means to bring said setting means and said exposure meter into corresponding positions, where the associated sliding tap contact is in operational relationship with said exposure meter as represented by the pointer thereof for establishing electrical connection with the corresponding resistance when said pointer is pressed towards said resistance by operation of said shutter release operator, whereby said exposure meter may move freely without load when said operator is not actuated.

2. An automatic camera setting device as set forth in claim 1, wherein one of said resistances is in operational relationship with said stop setting means, and the cooperating sliding tap contact is associated with said shutter speed setting means.

3. An automatic camera setting device as set forth in claim 1, wherein said adjusting means act alternatively either upon said stop setting means or upon said shutter speed setting means.

4. An automatic camera setting device as set forth in claim 1, wherein additional means are provided for instituting an operational relationship between said adjusting means and either said stop setting means or said shutter speed setting means.

5. An automatic camera setting device as set forth in claim 1, wherein a pressure bar is provided, which is actuated by said shutter release operator and which presses said pointer towards said associated resistance.

6. An automatic camera setting device as set forth in claim 1 in which one of said resistances is fixed to said stop setting means associated with said shutter and is curved into a substantially semi-circular path to conform with the shape thereof.

7. A camera automatic setting device as set forth in claim 1 in which said camera shutter is mounted adjacent a lens and an associated locking means for arresting the operation of said shutter release actuator when the preset constants for effecting an exposure of predetermined quality fall below a predetermined level.

8. A camera automatic setting device as set forth in claim 1 in which said shutter release actuator includes a spring driven mechanism which supplies the force for operating said shutter and wherein said spring driven mechanism is reset simultaneously with the setting of said shutter.

9. A camera automatic setting device as set forth in claim 1 in which a manually operative release device is provided for initiating in operation the movement of said shutter release actuator and in which an electrical contactor is controlled by said manually operative release device, a spring driven mechanism for supplying the force operating said shutter, and a motor device controlled by said contactor, said motor device coacting with said spring driven mechanism for resetting said mechanism and restoring said mechanism to a condition for operating said shutter release actuator.

10. A camera automatic setting device as set forth in claim 1 includes a pawl and ratchet mechanism and wherein a magnetic device operates said pawl and ratchet mechanism and a power source connected with said magnetic device for energizing said magnetic device.

11. A camera automatic setting device as set forth in claim 1 in which the resistance associated with said camera shutter is shaped to substantially surround said camera shutter and a tap thereon mechanically adjustable by the position of a ring member disposed adjacent said shutter.

References Cited in the file of this patent

UNITED STATES PATENTS

| | | |
|---|---|---|
| 2,188,820 | Riszdorfer | Jan. 30, 1940 |
| 2,282,659 | Kun | May 12, 1942 |
| 2,388,609 | Ericsson | Nov. 6, 1945 |

FOREIGN PATENTS

| | | |
|---|---|---|
| 649,259 | Germany | Aug. 19, 1937 |